United States Patent [19]
Chang et al.

[11] Patent Number: 6,167,033
[45] Date of Patent: Dec. 26, 2000

[54] MULTIPLE-PARTY NETWORK COMMUNICATION SYSTEM AND METHOD OF TROUBLESHOOTING THEREOF

[75] Inventors: Jackson Chang, Taipei, Taiwan; Zhou-Bin Wen, Shanghai, China; Ge-Nan Feng, Shanghai, China; Ou Cao, Shanghai, China

[73] Assignee: Inventec Corp., Taipei, Taiwan

[21] Appl. No.: 09/007,722

[22] Filed: Jan. 15, 1998

[30]  Foreign Application Priority Data

Oct. 28, 1997 [TW] Taiwan ................................. 86116001

[51] Int. Cl.[7] ............................ H04L 12/16; H04Q 11/00
[52] U.S. Cl. ........................................... 370/263; 370/241
[58] Field of Search ................................. 370/263, 260, 370/261, 262, 266, 270, 241–247; 395/200.34; 348/15, 14, 13, 17; 375/216, 217, 220, 222, 224, 225, 326; 704/200, 201, 208, 214, 231, 246, 251, 258

[56]  References Cited

U.S. PATENT DOCUMENTS

| | | | |
|---|---|---|---|
| 5,003,533 | 3/1991 | Watanabe | 370/258 |
| 5,365,265 | 11/1994 | Shibata et al. | 348/15 |
| 5,414,457 | 5/1995 | Kadowaki et al. | 348/14 |
| 5,434,797 | 7/1995 | Barris | 395/200.34 |
| 5,604,771 | 2/1997 | Quiros | 375/326 |
| 5,657,246 | 8/1997 | Hogan et al. | 348/15 |
| 5,660,176 | 8/1997 | Iliff | 600/300 |
| 5,666,407 | 9/1997 | Pfeifer | 379/406 |
| 5,812,534 | 9/1998 | Davis et al. | 370/260 |
| 5,844,600 | 12/1998 | Kerr | 370/260 |
| 5,890,115 | 3/1999 | Cole | 704/258 |
| 5,892,764 | 4/1999 | Riemann et al. | 370/401 |
| 5,949,475 | 9/1999 | Hatanaka et al. | 348/15 |
| 5,978,835 | 11/1999 | Ludwig et al. | 709/204 |

*Primary Examiner*—Dang Ton
*Assistant Examiner*—Phirin Sam
*Attorney, Agent, or Firm*—Pillsbury Madison & Sutro LLP

[57]  ABSTRACT

The present invention provides a multiparty network communication system, which is constructed by connecting system users in serial. Various types of information are packed and encoded according to protocol into information packets. When information packets are transmitted within the network, the receiving party distinguishes them according to the coding to be voice or data information and forwards them to various modules at user's end for further processing. Voice information is processed by virtue of the superimposing technology that mixes the receiving information with the voice information received at user's end and forwards to other adjoining users. A multiparty voice communication is then realized. Moreover, the present invention provides methods of manipulating user's system failure so in case one user system among conference participants fails, his neighboring users will be automatically connected to allow other participants to continue the multiparty network conferencing.

5 Claims, 5 Drawing Sheets

MULTIPLE-PARTY NETWORK COMMUNICATION SYSTEM AND METHOD OF TROUBLESHOOTING THEREOF

BACKGROUND OF THE INVENTION

1. Field of the Invention

The present invention relates to communication networking technologies, especially to network conferencing systems that can realize simultaneous transmission of voice, text, and various formats of data.

2. Description of the Related Arts

The advanced development in communication network and multimedia technologies has enabled the transmission of voice, text and various forms of data via networking media (such as Local Area Networks or LANs, or Internet systems). At present, commercially available products for transmitting multimedia data such as voice and text are Netmeeting from Microsoft and Internet Conference Professional from Volcaltec among others. These products have realized multiparty conferencing through LANs or Internet and enabled conference participants to fetch chat or whiteboard from other participants.

However, in Netmeeting of Microsoft, wherein the host of a conference A summons participants B, C and D for a network conference, host A first invites B to participate and there are voice (or speech) and data communications between A and B. The "data" as used herein includes non-vocalized text messages, whiteboard and other forms of data and excludes therefore voice, speech or audio data. But after C and D further join the network conferencing between A and B, C or D may only have data communication rather than voice communication with A and B. In other words, only parties A and B can enjoy voice communication, all other users can only undergo data communication and are unable to undergo voice communication. A multiple party voice communication is not realized.

Next, though improvements have been made in Internet Conference Professional by Vocaltec, its operation remains similar to that of Netmeeting by Microsoft. In Internet Conference Professional, conference host A summons B, C and D for participating in a network conference, host A has the privilege to choose one participant from B, C or D to undergo voice communication, while other conference participants are unable to listen to the contents of their talk. Only one party of the participants can communicate with the host at the same time, there is no voice communication among participants. Therefore, a multiple party voice communication is not realized.

To sum up, the commercially available products such as Netmeeting and Internet Conference Professional share two common flaws:

(1) Only one member of the conference participants can undergo voice or speech communication with the conference host, other participants can only undergo data communication, but not voice communication, among them. Such a system does not really actualize multi-party voice conferencing.

(2) If the conference host system crashes, the network conferencing will be forced to end, since no voice and data communications can be undergone at the same time among conference participants.

Therefore, the purpose of this invention is to provide a multiparty network communication system and methods of troubleshooting thereof. By virtue of simultaneous voice and data communication, each conference participant may speak at the same time and also listen to the voice messages when other participants are speaking, and at the same time transmit textual messages or other forms of data. A multiparty voice communication network conferencing system is then realized.

Two connection methods have been proposed in the protocol of Video Conference H.323, namely: decentralized multipoint connection and centralized multipoint connection. In decentralized multipoint connection framework, since each user is directly connected to another user, the communication system with other users will not be affected when one user's communication system fails. However, in decentralized multipoint connection framework, the required processing capabilities for individual system users are high and the system will need an enormous bandwidth. Further, in centralized multipoint connection framework, individual users are connected to a multipoint control unit, which controls the proceeding of the conference and will require significant processing capabilities.

SUMMARY OF THE INVENTION

An object of the present invention is to provide a multiparty network communication and methods of troubleshooting thereof so the voice and data communication of a conference participant with other conference participants will not be affected in case of system failure.

Another object of the present invention is to provide a multiparty network communication and methods of troubleshooting thereof, wherein the system needs neither strict requirements of processing capability for individual user units, nor rigid requirement in system bandwidth.

To achieve the above objects, the present invention provides a multiparty network communication system for transmitting voice information and data information, wherein said multiparty network communication system consists of a plurality of users to form a network, each of said users is connected to two other said users, except for the end user, which connects only to one of said users, each of said users comprises: a network interface unit for receiving and transmitting said information; a processor, coupled to said network interface unit, for recognizing the received said information as either said voice information or said data information; if said information is voice information, it can be superimposed up with said user's own voice information for further processing and transmitted later through said network interface unit and said network; if said received information is data information, it will further be transmitted via said network interface unit and said network; a voice processing unit, coupled to said processor, for receiving said user's own voice information and superimposing it up onto the processor and for processing said voice information said user receives; a display unit, coupled to said processor, for displaying said data information onto the display unit after said processor has identified said received information to be said data information; and a data input unit, coupled to said processor, for inputting said user's own data for further delivery to other said users through said processor and said network interface unit and said network.

Moreover, the present invention, by providing a multiparty network communication system and methods of troubleshooting thereof, can be applied to the system adjoining the first user and the second user; said methods comprise the following steps: (a) said second user constantly transmits testing data to said first user at timed intervals; (b) determining whether said second user can receive response data from said first user within specified time duration, if yes, returning to step (a); (c) determining whether said first user is still connected with other users, if not, sending said first user's logging-off message to users who are still connected with said second user; (d) requesting for a command and approval of connecting with the third user who is connected to said first user; and (e) connecting said second user with the third user.

BRIEF DESCRIPTION OF THE DRAWINGS

The aforementioned objects, features and advantages will become clear from the following detailed description of a preferred embodiment with reference to the accompanied drawings, wherein.

DESCRIPTION OF THE PREFERRED EMBODIMENT

Figure 1:
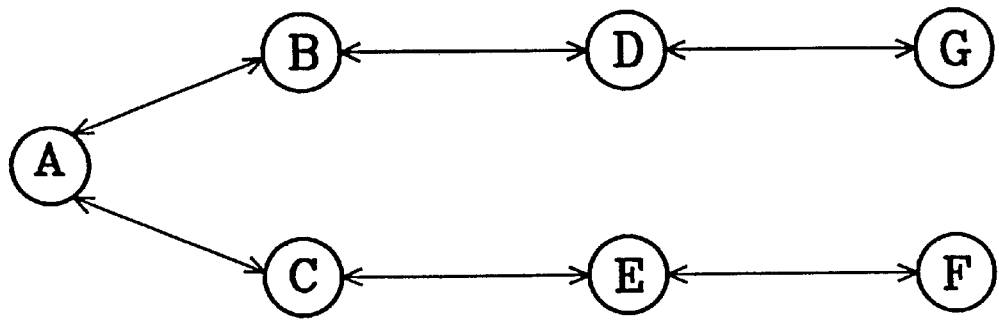
FIG. 1 is a diagram schematically depicting the connection framework among multiple users in a multiparty network communication system according to the present invention.

Refer to FIG. 1, which depicts the connecting framework among multiple users in a multiparty network communication system according to the present invention. As shown in FIG. 1, there are seven users A, B, C, D, E, F and G. Network users can be connected with other users through a protocol such as TCP/IP protocol and each user may be connected with up to two users at the same time. As shown in FIG. 1, user A may have direct connection with users B and C, and user B with users A and D, user C with users A and E, user D with users B and G, user E with users C and F, whereas end users G and F have direct connection only with users D and E, respectively. In other words, users A, B, C, D, E, F and G are connected in serial.

Figure 2:
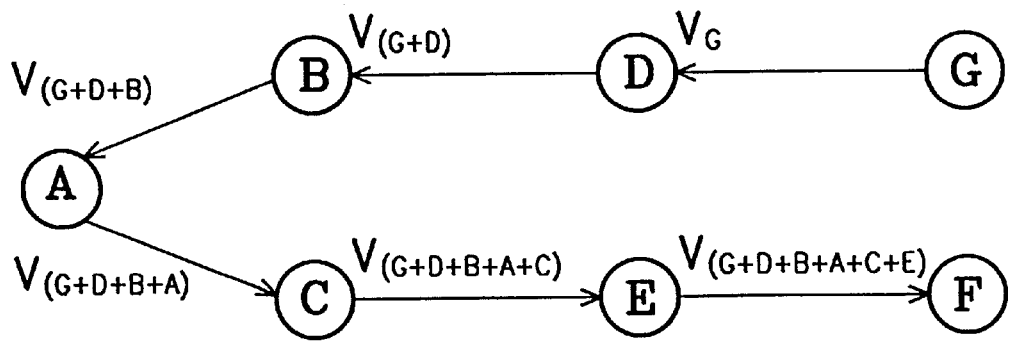
FIG. 2 is a diagram schematically depicting the system transmission of voice information of FIG. 1.

Refer further to FIG. 2, which depicts realization of multiparty speech communication of a network communication system according to the present invention. When user G transmits speech or voice data $V_G$ to user D, user D can superimpose own voice with incoming voice of user G into voice data $V_{(G+D)}$ for further transmission to user B. User B, after listening to the users D and G's voices, can superimpose own voice with their voices into voice data $V_{(G+D+B)}$ for further transmission to user A. Similarly, users G, D, B and A's voices may be superimposed into voice data $V_{(G+D+B+A)}$ and transmitted to user C, users G, D, B, A, and C's voices may be superimposed into voice data $V_{(G+D+B+A+C)}$ and transmitted to user E, and users G, D, B, A, C and E's voices can be superimposed up into voice data $V_{(G+D+B+A+C+E)}$ and transmitted to user F. In other words, in a network communication system according to the present invention, when a multiparty voice or speech communication is realized, each network user superimposes his own voice with the voice he receives, which is further transmitted to a neighboring user. Therefore, each user can listen to other users' voices. For example, user A may simultaneously listen to the voices of users B, C, D, E, F and G. Hence, the voice superimposition technology of the present invention enables each user participating in the conference participants to simultaneously listen to other users' voices and realizes an actual multiparty speech or voice communication.

Figure 3:
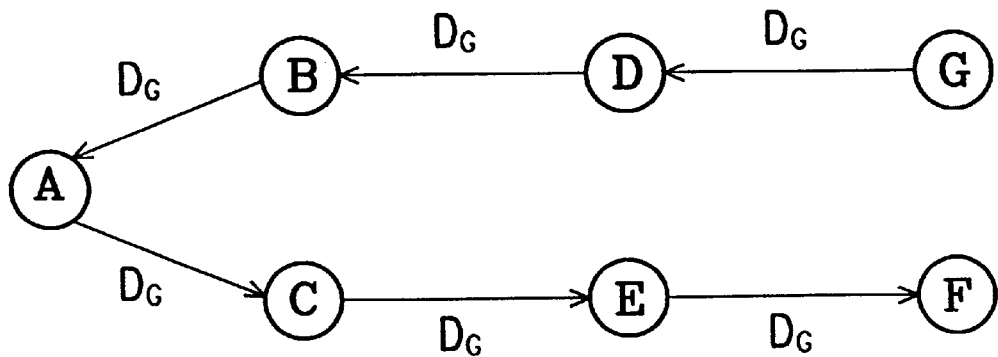
FIG. 3 is a diagram schematically depicting the system transmission of non-voice data information of FIG. 1.

FIG. 3 shows when the network communication system of the present invention is used for transmitting non-voice data such as text messages, graphic information or other formats of data information. FIG. 3 is a diagram depicting the transmission of non-voice data information of a network communication system according the present invention. When user G transmits data information $D_G$ to user D through the network, user D then displays the data originating from G and transmits user G's data information $D_G$ to user B, user B then displays the received data information and transmits further to user A. Similarly, the data information $D_G$ may also reach users C, E and F and be displayed. Therefore, each user may receive and display non-voice information from other users. What differs from the speech communication of FIG. 2 is: when the network communication system of the present invention is used for transmitting non-voice information, no superimposition technology as in speech communication is employed, data information is merely displayed and transmitted to a neighboring user, therefore data communication capabilities among users in known systems are maintained.

Figure 4:
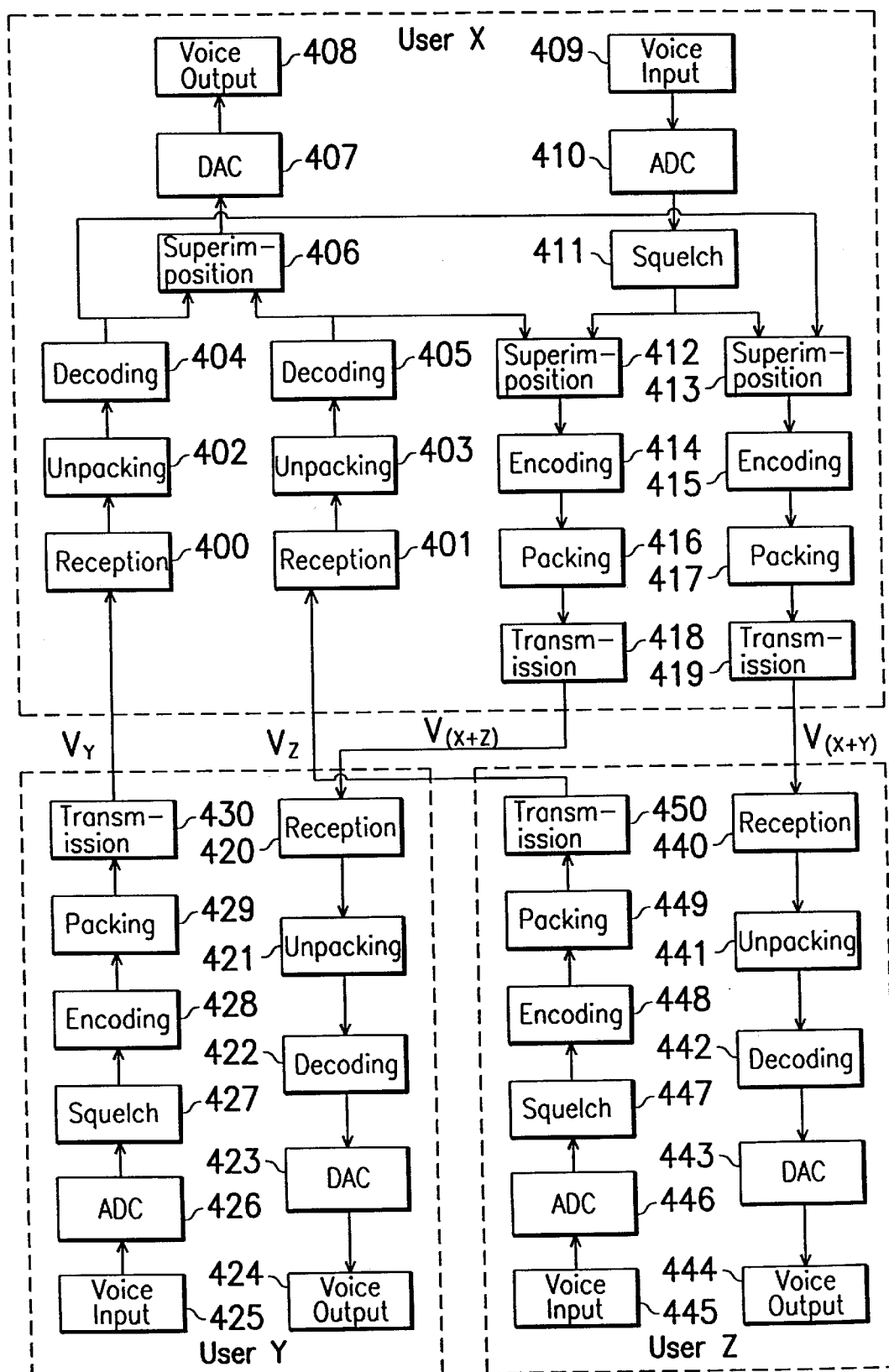
FIG. 4 is a block diagram depicting the modules of a multiparty network communication system for transmitting voice information according to the present invention.

Refer now to FIG. 4, a block diagram depicting the modules of a multiparty network communication system for transmitting voice information according to the present invention. In FIG. 4, where three users X, Y and Z are illustrated, user X is simultaneously connected with users Y and Z. Users Y and Z are terminal users and are connected only to user X, respectively. Since users A, B, C, D and E of FIG. 1. are connected simultaneously with two users, their method of processing is the same as that of user X of FIG. 4; users F and G of FIG. 1 are connected only to a user, their method of processing is the same as that of users Y and Z of FIG. 4.

First take user X as an example. User X receives from user's Y and Z through network reception modules 400 and 401 voice information packet $V_Y$ and $V_Z$, respectively, for unpacking modules 402 and 403 to further identify the received information packets. If the received information packets are voice information, they will then be forwarded to voice-decoding modules 404 and 405 for decoding; if the received information packets are non-voice data information, they will be forwarded to data output module 505 (to be described later). The decoded voice information will be accumulated at voice superimposing module 406 for superimposition and be converted by digital/analog (D/A) converting module 407 into analog signals and forwarded to voice output module 408. As a result, user X will be able to listen to users Y and Z's voices.

If user X intends to express himself, the voice is inputted through voice input module 409 and A/D converting module and converted into analog sound for quantification and sampling into digital signals and forwarded to squelching module 411. The functions of the squelching module 411 are to eliminate unnecessary portions of non-voice data during sampling and reduce the required amount of voice information for transmission via the network. In other words, it filters out unnecessary portions, such as noise, so as to reduce the amount of information and hence indirectly decrease the load in network transmission. The information being processed by the squelching module 411 is forwarded to voice superimposing modules 412 and 413 for superimposition respectively with users Y and Z's voice information processed by voice-decoding modules 404 and 405, and is further processed by voice-encoding modules 414 and 415 and packing modules 416 and 417 to be forwarded to network transmission modules 418 and 419. Voice-encoding modules 414 and 415 compress digital voice information to reduce the required amount of voice information in network transmission. Similarly, voice-decoding modules 404 and 405 decompress the compressed voice information into original voice information. Such an encoding-decoding method can be undertaken by way of Group Special Mobile (GSM) or Code Excited Linear Preprediction (CELP). Packing modules 416 and 417 then encode it according to communication protocol to various types of information to form various information packets and to ensure that during the simultaneous transmission of voice and non-voice data the receiving party will be able to correctly distinguish various types of information. Network transmission module 418 then transmits users X and Z's superimposed voice information packet $V_{(X+Z)}$ to user Y, and network transmission module 419 transmits users X and Y's superimposed up voice information packet $V_{(X+Y)}$ to user Z.

From user Y's perspective, user Y receives through network reception module 420 from user X voice information packet $V_{(X+Z)}$, which is further identified by the unpacking module 421 to be voice information or not; if yes, it is forwarded to voice-decoding module 422 for decompression; if not, it is forwarded to data output module 505 (to be described later). The decoded voice information is further converted into analogous information by D/A converting module 423 and forwarded to voice output module 424. Therefore, user Y may listen to users X and Z's voices.

Furthermore, since user Y's voice is sampled and quantified from the inputted analog voice into digital signals through voice input module 425 and A/D converting module 426 and forwarded to squelching module 427. The functions of the squelching module 427 are to filter out unnecessary portions, reduce the amount of information transmission and minimize the load for network transmission. The information after being processed by the squelching module 427 is then forwarded through voice-encoding module 428 and packing module 429 further to network transmission module 430. Voice-encoding module 428 compresses the voice information to reduce network transmission load of voice information. Similarly, voice-decoding module 422 decompresses the compressed voice information into original voice information. Such an encoding-decoding method can be undertaken by way of GSM or CELP. Packing module 429 will add an agreed code according to communication protocol to various types of information to form various information packets and to ensure the simultaneous transmission of voice and non-voice data. The receiving party will be able to correctly distinguish various types of information. Network transmission module 430 then transmits user Y's voice information packet $V_Y$ to user X.

From user Z's perspective, user Z receives through network reception module 440 from user X voice information packet $V_{(X+Y)}$, which is further identified by the unpacking module 441 to be voice information or not; if yes, it is forwarded to voice-decoding module 442 for decompression;

if not, it is forwarded to data output module (to be discussed later). The decoded voice information is further converted into analog information by D/A converting module 443 and forwarded to voice output module 444. Therefore, user Z may listen to users X and Y's voices.

However, since user Z's voice is sampled and quantified from the inputted analog voice into digital signals through voice input module 445 and A/D converting module 446 and forwarded to squelching module 447. The functions of the squelching module 447 are to filter out unnecessary portions, reduce the amount of information transmission and minimize the load for network transmission. The information after being processed by the squelching module 447 is then forwarded through voice-encoding module 448 and packing module 449 further to network transmission module 450. Voice-encoding module 448 compresses the voice information to reduce network transmission load of voice information. Similarly, voice-decoding module 442 decompresses the compressed voice information into original voice information. Such an encoding-decoding method can be undertaken by way of GSM or CELP. Packing module 449 will add a code according to communication protocol to various types of information to form various information packets and to ensure the simultaneous transmission of voice and non-voice data. The receiving party will be able to correctly distinguish various types of information. Network transmission module 450 then transmits user Z's voice information packet $V_Z$ to user X.

Figure 5:
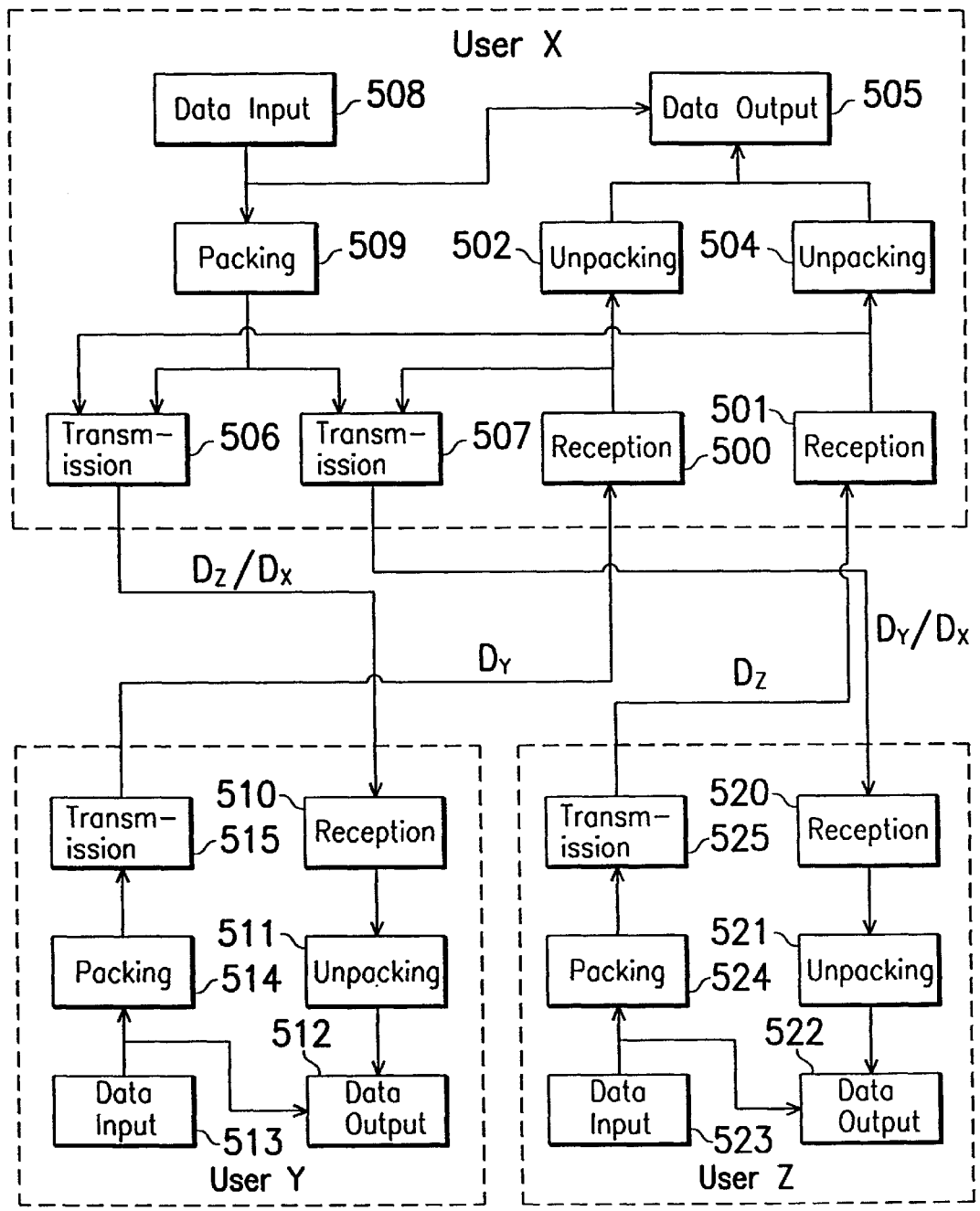
FIG. 5 is a block diagram depicting the modules of a multiparty network communication system for transmitting non-voice data information according to the present invention.

Refer to FIG. 5, a block diagram depicting the modules of a multiparty network communication system for transmitting non-voice data information according to the present invention. In FIG. 5, where only three users X, Y and Z are illustrated, user X is simultaneously connected with users Y and Z, which are end users and only connected with user X. Since users A, B, C, D, and E of FIG. 1 are simultaneously connected with two users, the processing method is the same as that with user X of FIG. 5; and users F and G of FIG. 1 are connected with only one user, their processing method is the same as those with users Y or Z of FIG. 4.

First take user X as an example, user X receives from users Y and Z through network reception modules 500 and 501 non-voice information data packet $D_Y$ and $D_Z$, respectively, for unpacking modules 502 and 504 to further identify the received information packets. Since the types of the received information packets may vary and carry different codes according to communication protocol, they are for unpacking modules 502 and 504 to identify. If the received information packets are voice information, they will then be forwarded to voice-decoding modules 404 and 405 for processing; if the received information packets are non-voice information, they will be forwarded to data output module 505 for displaying. Meanwhile, the received information packets through network reception modules 500 and 501 are forwarded respectively to network transmission modules 507 and 506, and further to users Z and Y, respectively. If there is data input from user X, the data will be forwarded to packing module 509 through data input module 508 for encoding according to communication protocol and packing them into various information packets to ensure that during the simultaneous transmission of voice and data information the receiving party is able to correctly distinguish various types of information. At the same time, the output from data input module 508 is forwarded to data output module 505 for displaying the inputted data and the information packets processed by packing module 509 are transmitted to users Y and Z through network transmission modules 506 and 507.

Further, from user Y's perspective, user Y receives through network reception module 510 from user X a data information packet Dz or Dx, which is further identified by the unpacking module 511 to be data information or not; if yes, it is forwarded to data output module 512 for displaying; if not, it is forwarded to voice-decoding module 422. Therefore, user Y is able to read the data from user Z or X. However, if user Y has data for other network users, the data will be forwarded to packing module 514 through data input module 513 for encoding according to communication protocol and the inputted data is packed into an information packet to ensure that during the simultaneous transmission of voice and data information the receiving party is able to correctly distinguish various types of information. At the same time, the output from data input module 513 is forwarded to data output module 512 for displaying the inputted data and the information packet processed by packing module 514 is transmitted to user X through network transmission module 515.

Furthermore, from user Z's perspective, user Z receives through network reception module 520 from user X a data information packet $D_Y$ or $D_X$, which is further identified by the unpacking module 521 to be data information or not; if yes, it is forwarded to data output module 522 for displaying; if not, it is forwarded to voice-decoding module 442. Therefore, user Z is able to read the data from user Y or X. However, if user Z has data for other network users, the data will be forwarded to packing module 524 through data input module 523 for encoding according to communication protocol and the inputted data is packed into an information packet to ensure that during the simultaneous transmission of voice and data information the receiving party is able to correctly distinguish various types of information. At the same time, the output from data input module 523 is forwarded to data output module 522 for displaying the inputted data and the information packet processed by packing module 524 is transmitted to user X through network transmission module 525.

Figure 6:
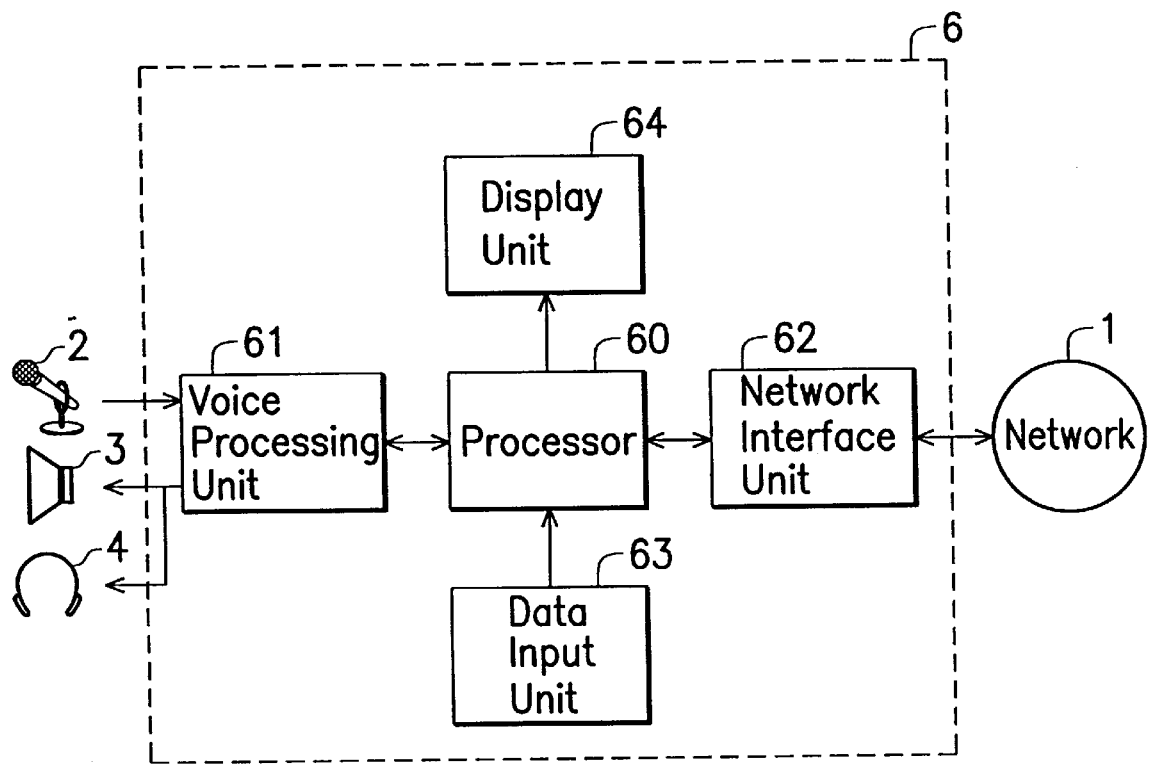
FIG. 6 is a block diagram depicting a user's terminal within a multiparty network communication system according to the present invention.

FIG. 6 is a block diagram depicting a user's terminal within a multiparty network communication system according to the present invention; wherein the user can be any of users X, Y and Z of FIG. 4. User 6 can be, for instance, a personal computer (PC) or a network television (net TV). Such a user terminal 6 comprises: a processor 60, a voice processing unit 61, a network interface unit 62, a data input unit 63 and a display unit 64. If the user terminal 6 is a PC, the voice processing unit can be a Sound Blaster card, the network interface unit 62 can be a network interface card, a modem or a modem card, the data input unit 63 can be a device such as a keyboard or a scanner, and the display unit can be a cathode-ray tube or liquid crystal display.

As shown in FIG. 6, voice processing unit 61 is coupled with processor 60. The fetched input of voice information is forwarded to processor 60 for processing. Conversely, processor 60 forwards the voice information to voice processing unit 61 for outputting. Network processing unit 60, which is also coupled to processor 60, serves as interface of fetching and transmitting information packets between network 1 and processor 60. Network interface unit 62 is coupled to network 1 through a BNC cable or telephone line, network 1 is connected into a framework as shown in FIG. 1, data input unit 63 serves as a non-voice data input device, the data is processed by the processor and transmitted to display unit 64 for displaying.

Voice input modules 409, 425 and 445, voice output modules 408, 424 and 444, D/A converting modules 407, 423 and 443 and D/A converting modules 410, 426 and 446 as found in FIG. 4 are all implemented in the voice processing unit 61 of FIG. 6. Network reception modules 400, 401, 420 and 440, network transmission modules 418, 419, 430 and 450 of FIG. 4 and network reception modules 500, 501, 510 and 520 and network transmission modules 506, 507, 515 and 525 of FIG. 5 are all implemented in the network interface unit 62 of FIG. 6. Data input modules 508, 513 and 523 of FIG. 5 are a part of the data input unit 63 of FIG. 6 and data input modules 505, 512 and 522 of FIG. 5 a part of the display unit 64. Others such as squelching module, voice superimposing module, packing module and unpacking modules are all built into processor 60. The analog sound input from voice processing unit 61 of FIG. 6 is received by a microphone 2 and converted into electronic signals and the voice information to be outputted to a speaker 3 or headset (earphone) is reverted to analog sound output.

However, to realize simultaneous transmission of voice and data information and for the receiving party to correctly distinguish types of information, which is further processed differently as voice or data according to the modules as shown in the block diagrams of FIGS. 4 and 5, a strict protocol is established according to the present invention for controlling the coding to be added by packing modules before various types of information are transmitted. The type of information can be distinguished by a receiving party who receives the information sent out by other users and its contents can be processed according to the type of the information being received by eliminating the protocol coding of the actual valid data to be further processed by various modules. If the received information packet is voice information, then it will be processed by the modules as in the block diagram of FIG. 4; if the received information packet is data information of text and graphics, it is then processed according to the block diagrams of modules of FIG. 5. An example of an information packet according to the present invention is as follows:

| Type | Format | total length of info packet | reserved characters | actual valid data |
|---|---|---|---|---|
| Type: | | | specifies the type of the information transmitted through said information packet, which is distinguished for instance as voice/text/graphic info type; | |
| Format: | | | specifies further the characteristic of said information packet, such as the encoding format of the data, message of sampling analog/digital or digital/analog frequency by sound card; | |
| Total length of info packet: | | | specifies the total length of the information in an info packet for purposes of reception and correction by the receiving party; and | |
| Actual valid data: | | | holds actual valid information such as voice, text or graphics. | |

Figure 7:
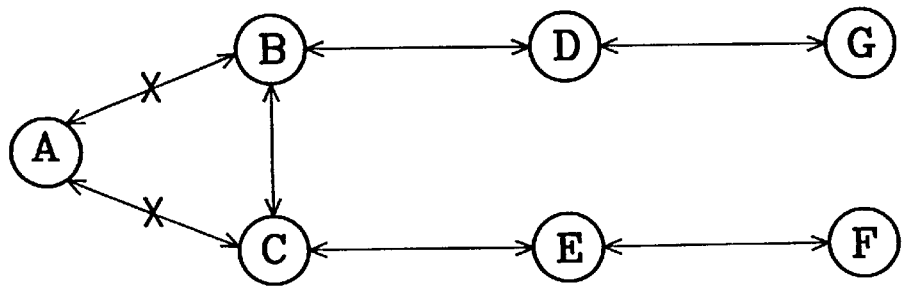
FIG. 7 is a diagram schematically depicting the on-going network communication among other users after user A's system failure.

FIG. 7 illustrates the on-going network communication among other users when a user's system fails as shown in FIG. 1. According to the present invention, as in the connecting framework of FIG. 1, when conference participant A's system fails and voice and data communication cannot be established, other adjoining participants B and C will be automatically connected (as shown in FIG. 7) so the multiparty network conferencing among other conference participants can still be continued.

Figure 8:
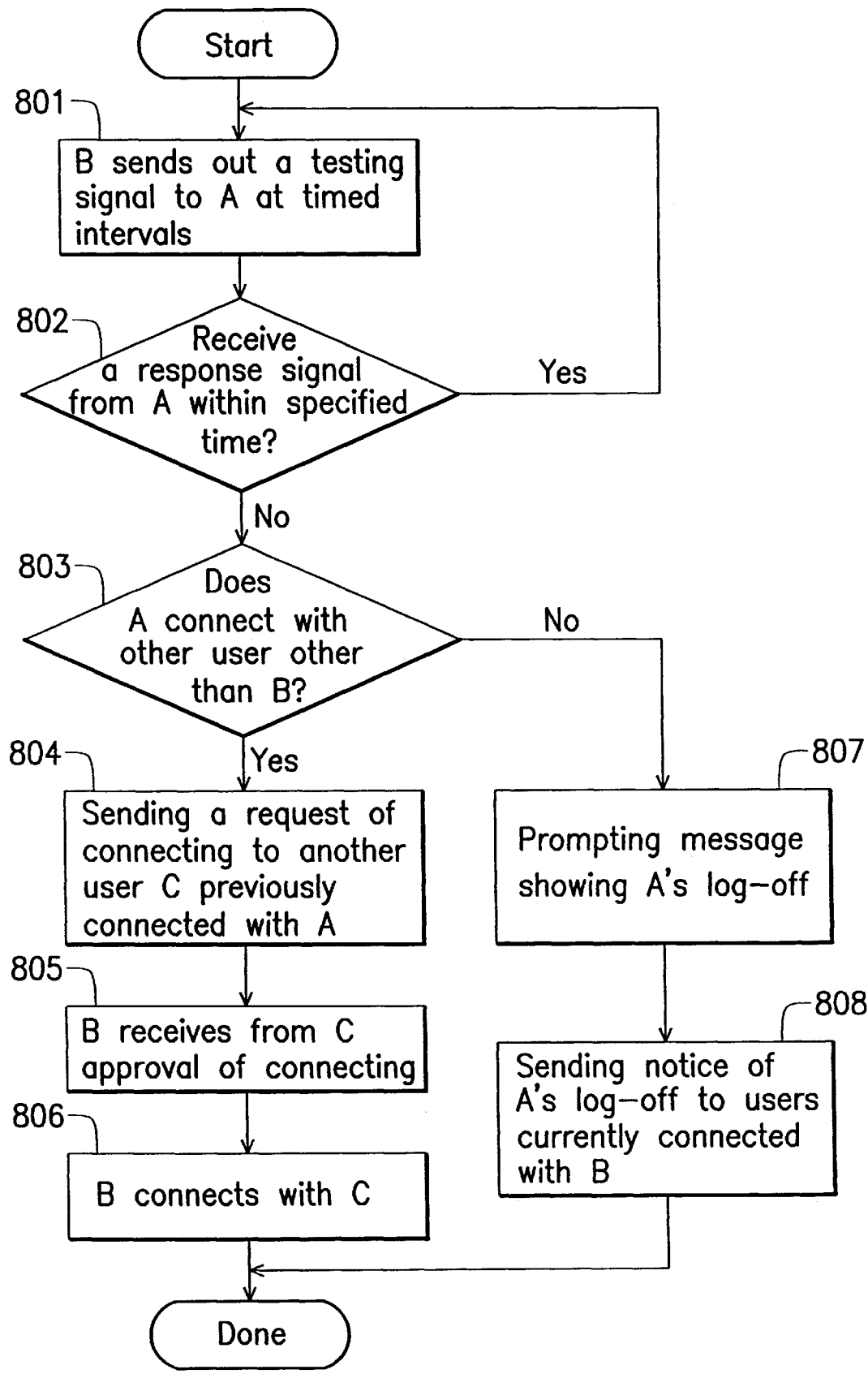
FIG. 8 is a flow chart depicting the connection between users B and C of FIG. 7.

FIG. 8 is a flow chart depicting the connection established between users B and C of FIG. 7. After the step START, user B keeps on sending testing signal to user A at timed intervals in step 801, and determines whether he receives response signal from user A within specified time; is if yes, user A's system indicates to be normal and the process returns to step 801; if not, user A's system indicates to be malfunctioning and not communicating; process continues to determine whether user A has any established connection with another user other than user B in step 803; if yes, it will send out an instruction requesting a connection with user C in step 804 and establishing a connection with users B and C in step 806 after user B gets an instruction approving the connection with user C in step 805; if not, user A is indicated as an end user and a message showing user A's logging-off from the conference is prompted in step 807 and users currently connected with user B will be notified of user A's logging-off from the conference on step 808. Therefore, even if one user's system fails, other user connections can still be established and the multiparty network conferencing be continued.

To summarize, in the multiparty network communication system according to the present invention, various types of information or information packets are packed and encoded according to protocol. When the information packets are transmitted though a network, the receiving party will distinguish them according to the coding to be voice or data Information and forwards them to other modules at user's end for further processing. Voice information is processed by virtue of the superimposition technology that mixes the receiving information with the voice information received at user's end and forwards to other adjoining users. A multiparty voice communication is then realized. Moreover, the present invention provides methods of manipulating user's system failure in case one user system among conference participants fails, his neighboring users will be automatically connected to allow other participants to continue the multiparty network conferencing.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A method of troubleshooting a multiparty network communication system having a first user device adjoining a second user device, said method comprising:
   (a) constantly sending out a testing signal by said second user device to said first user device at timed intervals;
   (b) determining whether said second user device can receive a response signal from said first user device within a specified time duration, wherein said second user device constantly sends out a testing signal to said first user device at timed intervals when said second user device receives a response signal;
   (c) determining whether said first user device is connected with a third user device, said second user device sending a notice that said first user device has logged off said system when first user device is determined to be disconnected, wherein said second user device constantly sends out a testing signal to said first user device at timed intervals;
   (d) requesting, by said second user device, to be connected with said third user device; and
   (e) connecting said second user device with said third user device.

2. The method as claimed in claim 1, wherein said multiparty network communication system further comprises:
   a processor for performing each step, and
   a network interface unit for transferring information including said logging-off notice between said first user device and said second user device.

3. The method as claimed in claim 2, wherein said processor, coupled to said network interface unit, is programmed and operated so as to recognize said transferred information as either voice or data information, and when said voice information is recognized, said transferred information is superimposed with local voice information generated by a voice processing unit.

4. The method as claimed in claim 3, wherein said voice and data information are packed into distinguishable information packets by said processor before transferring through said network.

5. The method as claimed in claim 3, wherein the local voice information is further processed by the processor for squelching and encoding.

* * * * *